United States Patent [19]

Pearlstein et al.

[11] 4,278,515

[45] Jul. 14, 1981

[54] METHOD FOR REMOVAL OF SODIUM CARBONATE FROM CYANIDE PLATING BATHS

[75] Inventors: Fred Pearlstein, Philadelphia, Pa.; Carroll F. Evans, Cinnaminson, N.J.

[73] Assignee: The United States of America as represented by the Secretary of the Army, Washington, D.C.

[21] Appl. No.: 84,964

[22] Filed: Oct. 15, 1979

[51] Int. Cl.³ .................. B01D 9/02; C25D 21/02
[52] U.S. Cl. .................. 204/55 Y; 204/DIG. 13; 204/45 R; 204/274; 210/737
[58] Field of Search ............. 204/DIG. 13, 55 Y, 274, 204/45 R; 210/71, 42 R, 43, 737

[56] References Cited

U.S. PATENT DOCUMENTS

| | | | |
|---|---|---|---|
| 2,073,664 | 3/1937 | Weisberg et al. | 204/274 X |
| 2,516,105 | 7/1950 | Mateosian | 204/274 X |
| 3,737,384 | 6/1973 | Fletcher et al. | 210/71 X |

OTHER PUBLICATIONS

William Blum et al., "Principles of Electroplating and Electroforming", p. 286, (1949).

Primary Examiner—G. L. Kaplan
Attorney, Agent, or Firm—Nathan Edelberg; Robert P. Gibson; A. Victor Erkkila

[57] ABSTRACT

The invention is an improved apparatus for the removal of sodium carbonate from cyanide plating baths. The method involves the precipitation of sodium carbonate by the effect of cooling the cyanide plating bath liquid. A container is submerged in the solution with the container opening extending above the plating bath solution level. The container is filled with dry ice and water which produces a temperature of approximately zero degrees centigrade inside of the container. The solution adjacent to the exterior of the container is cooled so that excess sodium carbonate is precipitated as a crystalline deposit. After a desired interval, the container is removed with the encrustation of sodium carbonate for disposal.

3 Claims, 5 Drawing Figures

METHOD FOR REMOVAL OF SODIUM CARBONATE FROM CYANIDE PLATING BATHS

GOVERNMENTAL INTEREST

The invention described herein may be manufactured, used and licensed by or for the Government for Governmental purposes without payment to us of any royalty thereon.

BACKGROUND AND SUMMARY OF THE INVENTION

The invention relates to metal plating systems, and in particular to plating systems using a cyanide solution as a plating bath. Specifically, the invention relates to a method and apparatus for the removal of sodium carbonate from a cyanide-zinc plating bath solution.

It is sometimes necesssary to remove carbonates that build up in alkaline-cyanide plating baths as a result of absorption of carbon dioxide ($CO_2$) from the surrounding air and from cyanide decomposition at the anode of the plating system.

When excessive carbonates build up in the plating baths, rough or dull deposits on the plated surface may result.

There is an on-going emphasis on reducing the amount of chemical agents entering the waste effluent. As a result, there is a corresponding emphasis on reducing the dragout losses in plating operations, and also an emphasis on recycling dragout chemicals back into the plating bath solutions. This action results in a tendency for the carbonate content of plating baths to become higher than is generally normal. Under the circumstances, it is necessary to effect the removal of the carbonate compound more often. This invention provides a method and apparatus to accomplish that removal conveniently and efficiently.

The conventional method of removing carbonate compounds in each year, during the winter, is to transfer the plating bath solution to another tank outside and at or near freezing temperatures. The sodium carbonate then precipitates from the plating bath solution and settles to the bottom of the tank. The supernatant liquid is then pumped back to the plating tank.

There are disadvantages to the conventional method. There is poor control of the temperature and much loss of desirable bath constituents may result from too low a temperature. Bath solution may be trapped along with the carbonate crystals. Another disadvantage is that not all plating facilities have the necessary equipment and extra tanks to utilize this method. In some areas there may not be a cold weather climate to precipitate the carbonate compounds in this manner.

Another method used for removing carbonate compounds is to add barium or calcium salts which precipitate the carbonate compounds. This method also requires an extra tank and is troublesome. This method also can change the plating bath composition if the barium or calcium salts are not added with proper anion or in the proper quantities.

It is to be understood that only the sodium-based plating bath solutions can be sodium carbonate precipitated by both the cooling method and the chemical precipitation method. The potassium plating bath solutions produce such soluable carbonate solutions that only the chemical precipitation method can be used.

The method and apparatus of this invention for the removal of carbonate from a cyanide-zinc plating bath solution involves the use of a container, open at one end, dry ice, and water. The container is submerged in the plating bath solution with the open end extending above the level of the plating bath solution. The container is filled with dry ice and water which produces a temperature of approximately zero degrees centigrade inside the container.

The plating bath solution adjacent to the exterior of the container is cooled so that excess sodium carbonate is precipitated as a crystalline deposit on the exterior of the container. After a desired interval, the container is removed from the plating bath solution with the encrustation of sodium carbonate for disposal.

It is to be understood that to fill the container with the dry ice and water before submerging the container into the plating bath solution is within the scope and intent of the invention.

Experimentation with a cylindrical container four inches in diameter and 30 inches long proved the feasibility of the method and apparatus. Cup-like appendages affixed to the exterior of the cylinder were used to catch any precipitated crystals that might fall off, however there was little evidence of this. The cup-like appendages also served to prevent the deposit of precipitated crystals from sliding off of the cylindrical container before removing it from the plating bath solution.

In order to further lower the temperature of the liquid in the container, a water-miscible solvent may be added to the liquid in the container, such as a low molecular weight alcohol or acetone.

The greater the exterior surface of the container the greater the amount of carbonate that can be removed. For example, a thin rectangular container approximately only one and one-half inches wide, but of long length and height, would accept cakes or slabs of dry ice (which are usually about one inch thick and approximately ten inches wide by ten inches long). Another means of increasing the exterior surface is to corrugate the exterior "skin" of the container. Still another means is to extend fins from the container exterior surface that would conduct the cold temperature from the main container for some distance from the container, and thus provide more surface on which to precipitate the carbonate crystals.

It is to be understood that the aforementioned variations in configuration and other geometrical and mechanical variations to increase the exterior surface area are within the scope and intent of the method and apparatus of this invention.

A variation in the shape of the exterior surface, such as by a series of corrugations, will aid in preventing the encrusted crystals from sliding off of the container. Such configuration eliminates the necessity of the aforementioned cup-like appendages.

An analysis of a sample of the dry encrustation removed from a container indicates that there was a ratio of 58 parts of sodium carbonate to 0.03 part of sodium cyanide and 0.002 part of zinc. Thus, there was little loss of cyanide or zinc.

It is, therefore an object of the invention to provide a method and apparatus to remove carbonate compounds from plating bath solutions.

It is another object of the invention to provide a method and apparatus to remove carbonate compounds from plating bath solutions with very little loss of the main constituents of the plating bath solution.

It is also an object of the invention to provide an apparatus to remove carbonate compounds from plating bath solutions that is simple in structure.

It is still another object of the invention to provide a method to remove carbonate compounds from plating bath solutions that is simple in operation.

It is yet another object of the invention to provide a method and apparatus to remove carbonate compounds from plating bath solutions that does not require extra equipment and extra tanks to transfer the plating bath solution for the operation.

It is also still another object of the invention to provide a method and apparatus to remove carbonate compounds from plating bath solutions that can be used in any area regardless of weather conditions.

Further objects and advantages of the invention will become more apparent in the light of the following description of the preferred embodiments.

DESCRIPTION OF THE PREFERRED EMBODIMENTS

Figure 1:
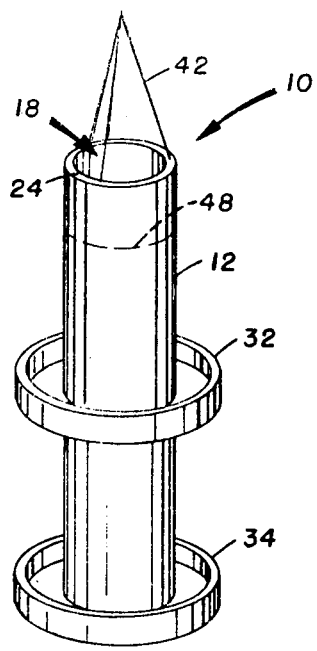
FIG. 1 is a perspective view of a first embodiment of an apparatus for removing carbonate compounds from plating bath solutions.
Figure 2:
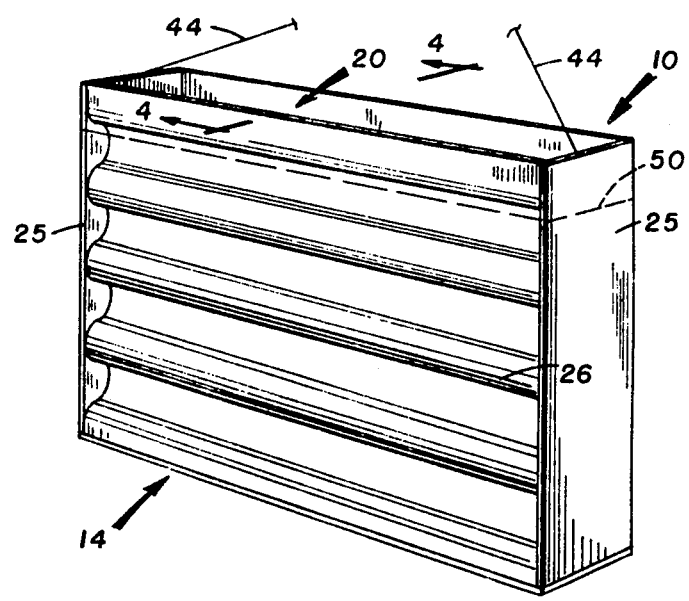
FIG. 2 is a perspective view of a second embodiment of an apparatus for removing carbonate compounds from plating bath solutions.
Figure 3:
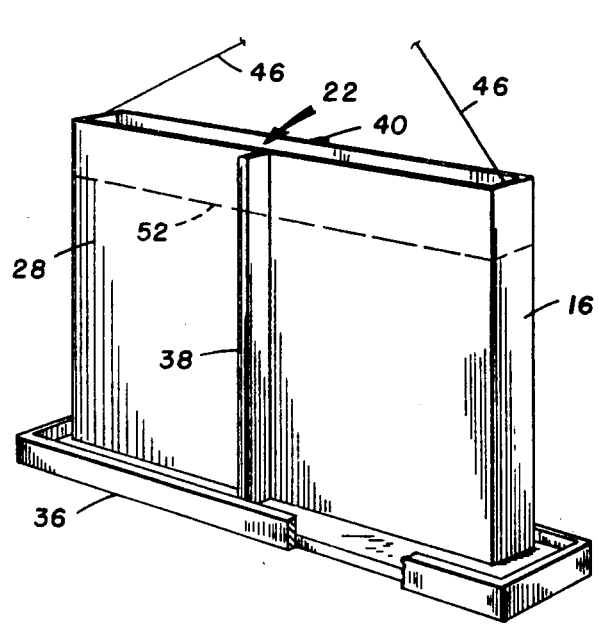
FIG. 3 is a perspective view of a third embodiment of an apparatus for removing carbonate compounds from plating bath solutions.

Referring now to the drawings and particularly to FIGS. 1, 2, and 3, an apparatus for removing carbonate compounds from a plating bath solution is shown at 10 for three different embodiments. Although the embodiments are different, to show the wide variation of structure which may be practiced, the operation of the apparatus of the system for removing carbonate compounds is exactly the same.

All three embodiments are in the configuration of a container. In FIG. 1 the container 12 of the first embodiment is of a cylindrical shape. In FIG. 2 the container 14 of the second embodiment is rectangularly shaped and has corrugated sides. And in FIG. 3 the container 16 is rectangularly shaped with smooth sides and ends.

It is to be understood that the container body means (12, 14, and 16) such as in FIGS. 1, 2, and 3, may be any configuration as long as the container is a hollow body means, closed at the bottom, and open at the top so that it may be filled with dry ice and water. The sides and ends may be of any configuration, such as in FIGS. 1, 2, and 3, or any combination thereof, such as corrugated sides 26 and smooth ends 25.

As noted in the background, the area adjacent to the plating bath solution may be increased in order to speed up the process, provide more surface area on which the carbonate compound may deposit, and make the operation more efficient. The corrugation of the sides of the container body means 14 is one method. Another method is to add one or more fin-like projections 38 and 40 to the sides or ends of the container body means 16 in order to dissipate, the cold temperatures created by the dry ice and water and provide a larger cold surface area.

All container body means 12, 14 and 16, are enclosed, having a bottom, such as bottom 30 of container body means 14. All container body means are open at the top to facilitate loading the dry ice and water into the hollow body means, such as the open top 18 of container 12, the open top 20 of container 14, and the open top 22 of container 16.

As noted hereinbefore the exterior surface or "skin" of the container body means may be of any configuration. The cylindrical container 12 has smooth "skin" 24, the rectangularly shaped container 14 has corrugated "skin" 26 on the sides and smooth "skin" 25 on the ends, and the rectangularly shaped container 16 has smooth "skin" 28. The container body means may be formed as one integral unit.

In order to catch any precipitated crystals that may drop off or separate from the encrustation of the carbonate compound, a cup-like appendage 32 and 34 are shown on container 12. A similar cup-like or pan-like appendage 36 is shown on container 16. The cup-like appendages 32, 34, and 36 surround the container body means. These cup-like or pan-like appendages 32, 34, and 36 also prevent the entire mass of carbonate compound crystals of the encrustation from sliding off of the respective container body means. The corrugated "skin" 26 is another means of preventing the encrustation from sliding off of the container body means.

In order to lift the container body means 12, 14, and 16 into the plating bath solution tank (not shown), a lifting means 42, 44, and 46 is affixed to the respective container body means 12, 14, and 16. Depending upon the size of the respective container body means and its weight, the container body means may be lifted into the plating bath solution manually or by mechanical means.

Some means must be available for maintaining the container body means in an upright position. This may by accomplished by keeping the container body means suspended from the mechanical lifting means during the operational period of the apparatus, providing a rack means in the solution in the tank, providing a form of grill work means across the top of the tank to steady the container body means, or any similar facility. It is to be understood that any such means provided or utilized to maintain the container means in an upright position are within the scope and intent of this invention.

Figure 4:
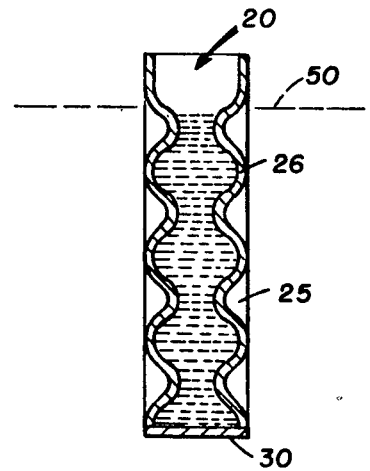
FIG. 4 is a cross-sectional view on line 4—4 of FIG. 2.
Figure 5:
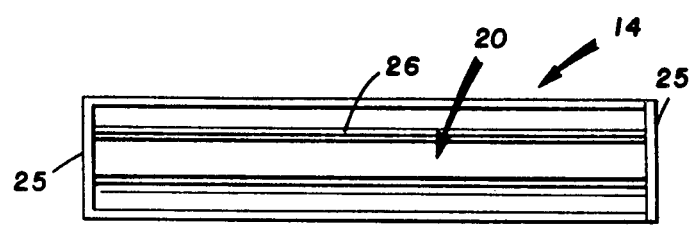
FIG. 5 is a top view of FIG. 2.

The container body means 12, 14 and 16 is lowered into the plating bath solution to a point just below the open top of the container body means, such as indicated by the dotted lines 48 on container 12, the dotted lines 50 on container 14 (also shown in FIG. 4), and the dotted lines 52 on container 16.

The dry ice may be placed in the various container body means in slabs or sheets, if the container body means is so designed, or it may be broken up into chunks or lumps to fit into any configuration of a container body means. It is to be noted that the dry ice and water becomes a part of the overall apparatus that is involved in and effective in removing said carbonate compounds.

When the container body means with its encrustation of carbonate crystals is removed from the plating bath solution the encrustation is scraped or rinsed off of the container surface for disposal.

In an example a cylindrical steel container having a diameter of 4 inches and a length of 30 inches was placed into a sodium cyanide-zinc plating bath at 21° C. (70° F.) containing sodium zinc cyanide ($Na_2Zn(CN)_4$), sodium zincate ($Na_2ZnO_2$), sodium cyanide (NaCN), sodium hydroxide (NaOH), brightening agents, and 14 ounces per gallon of sodium carbonate ($Na_2CO_3$). The container was filled to a height of 27 inches with dry ice and water which formed a solution having a temperature of 0° C. After about 3 hours a crust about ½ to ¾ inch thick had been formed on the exterior of the container and there appeared little additional benefit to longer immersions. The container was removed after about 5 hours immersion and allowed to drain. The dry deposit thus obtained weighed 8 pounds. A sample of the deposit weighing 58 grams was dissolved in a liter of distilled water and analyzed as follows:

| | |
|---|---|
| sodium carbonate ($Na_2CO_3$) | 58 g/l |
| sodium cyanide (NaCN) | 0.03 g/l |
| zinc | 0.002 g/l |

It is thus evident that the present invention results in insignificant losses of cyanide or zinc and accomplishes the removal of sodium carbonate in a simple and effective manner.

As can be readily understood from the foregoing description of the invention, the present structure can be configured in different modes to provide the ability to hold dry ice and water and to have a surface on which carbonate compounds could deposit in the process.

Accordingly, modifications and variations to which the invention is susceptible may be practiced without departing from the scope and intent of the appended claims.

What is claimed is:

1. A method for removing sodium carbonate from a plating bath solution containing same, which comprises immersing therein a container filled with a liquid cooled with dry ice to a temperature sufficient to cause the sodium carbonate to precipitate on the cold exterior surface of the container, maintaining said container immersed in said solution to precipitate the sodium carbonate as an encrustation of crystals on said cold container surface, and removing said container with said encrustation of sodium carbonate crystals from said plating bath solution.

2. The method of claim 1, wherein the bath is a sodium cyanide-zinc plating bath solution.

3. The method of claims 1 or 2, wherein the liquid is water.

* * * * *